United States Patent
Wagner et al.

(10) Patent No.: US 9,779,197 B1
(45) Date of Patent: Oct. 3, 2017

(54) METHOD AND SYSTEM OF MERGING MEMORY CELLS INTO MULTI-BIT REGISTERS IN AN INTEGRATED CIRCUIT LAYOUT

(71) Applicant: Microsemi Solutions (U.S.), Inc., Aliso Viejo, CA (US)

(72) Inventors: Kenneth David Wagner, Ottawa (CA); Howard Shih Hao Chang, Vancouver (CA); Kanwaldeep Singh Chhokar, Surrey (CA); Redentor De La Merced, Ottawa (CA); Yoo Ho Cho, Vancouver (CA)

(73) Assignee: MICROSEMI SOLUTIONS (U.S.), INC., Aliso Viejo ( * ) Notice: Subject to any disclaimer, the term of this patent is extended or adjusted under 35 U.S.C. 154(b) by 186 days.

(21) Appl. No.: 14/622,254

(22) Filed: Feb. 13, 2015

(51) Int. Cl.
*G06F 17/50* (2006.01)
*H03K 3/037* (2006.01)

(52) U.S. Cl.
CPC ......... *G06F 17/5068* (2013.01); *H03K 3/037* (2013.01)

(58) Field of Classification Search
CPC . G06F 17/5022; G06F 17/505; G06F 17/5027
USPC ....................................................... 716/119
See application file for complete search history.

(56) References Cited

U.S. PATENT DOCUMENTS

| | | | | |
|---|---|---|---|---|
| 6,018,622 A | * | 1/2000 | Lin | G06F 17/505 716/105 |
| 2003/0023941 A1 | * | 1/2003 | Wang et al. | 716/4 |
| 2004/0239392 A1 | * | 12/2004 | Anshumali et al. | 327/199 |
| 2013/0205271 A1 | * | 8/2013 | Kanno | 716/103 |
| 2014/0298283 A1 | * | 10/2014 | Chen et al. | 716/114 |

FOREIGN PATENT DOCUMENTS

CA 2248030 3/1999

OTHER PUBLICATIONS

Paik et al., "Implementation of Pulsed-Latch and Pulsed-Register Circuits to Minimize Clocking Power", ICCAD, Nov. 7-10, 2011, pp. 640-646.
Chang et al., "Novel Pulsed-Latch Replacement Based on Time Borrowing and Spiral Clustering", ISPD, Mar. 2012, pp. 121-128.
(Continued)

*Primary Examiner* — Suchin Parihar
(74) *Attorney, Agent, or Firm* — Dennis R. Haszko

(57) ABSTRACT

A method and system of merging one-bit cells in an integrated circuit layout, comprising a database to store the layout, a placer in communication with the database to update the layout, and a merger in communication with the placer. The merger is configured to: identify a set of one-bit cells in the integrated circuit layout; determine a set of merge cells, from among the identified set of one-bit cells, to be merged into a multi-bit register, the determination of the set of merge cells being based on each merge cell being located within a merge distance from each of the other merge cells in the set of merge cells, and each merge cell sharing a clock with the other merge cells in the set of merge cells; and generate instructions to the placer for merging the set of merge cells to form the multi-bit register in the integrated circuit layout.

19 Claims, 7 Drawing Sheets

(56) References Cited

OTHER PUBLICATIONS

Jiang et al., "INTEGRA: Fast Multibit Flip-Flop Clustering for Clock Power Saving", IEEE Transactions on Computer-Aided Design of Integrated Circuits and Systems, Feb. 2012, vol. 31, No. 2, pp. 192-204.

Prakash et al., "Achieving Reduced Area by Multi-Bit Flip Flop Design", International Conference on Computer Communication and Informatics (ICCCI-2013), Jan. 4-6, 2013, Coimbatore, India, 4 pages.

He et al., "Clock Network Power Saving Using Multi-Bit Flip-Flops in Multiple Voltage Island Design", Proceedings of the 2nd International Conference on Computer Science and Electronics Engineering (ICCSEE 2013), Jan. 2013, Published by Atlantis Press, Paris, France, pp. 1497-1502.

* cited by examiner

METHOD AND SYSTEM OF MERGING MEMORY CELLS INTO MULTI-BIT REGISTERS IN AN INTEGRATED CIRCUIT LAYOUT

FIELD

The present disclosure relates to integrated circuit memories and their design.

BACKGROUND

A memory cell is an electronic circuit that can be used to store bits of information. Flip-flops and latches are examples of memory cells that can be used to store one bit of information. A flip-flop stores the bit as one of two stable states, typically referred to as high and low states. The stables states may also be known by other naming conventions, such as "1" and "0".

Though not a strict definition, a flip-flop also generally refers to a circuit that is edge-triggered. That is, the switching of the stable state held in the flip-flop circuit is triggered by a signal edge, such as a clock edge. Another type of edge-triggered memory cell is a pulsed-latch, which behaves similarly to an edge-triggered flip-flop.

A well-known type of flip-flop is the D flip-flop. The D flip-flop stores the value of the D-input either at a rising clock signal edge or at a falling clock signal edge. The stored value is provided at a Q output and, optionally, the complement of the stored value is provided at a Q' output. The D flip-flop thus stores a single bit of information and this information may be updated every clock cycle.

It follows that multiple D flip-flops can store multiple bits of information. When the clock inputs of these multiple D flip-flops are driven by the same clock signal, these multiple D flip-flops behave as a register, which is suitable for storing a multi-bit word of information.

BRIEF DESCRIPTION OF THE DRAWINGS

Embodiments of the present disclosure will now be described, by way of example only, with reference to the attached Figures.

DETAILED DESCRIPTION

Figure 1:
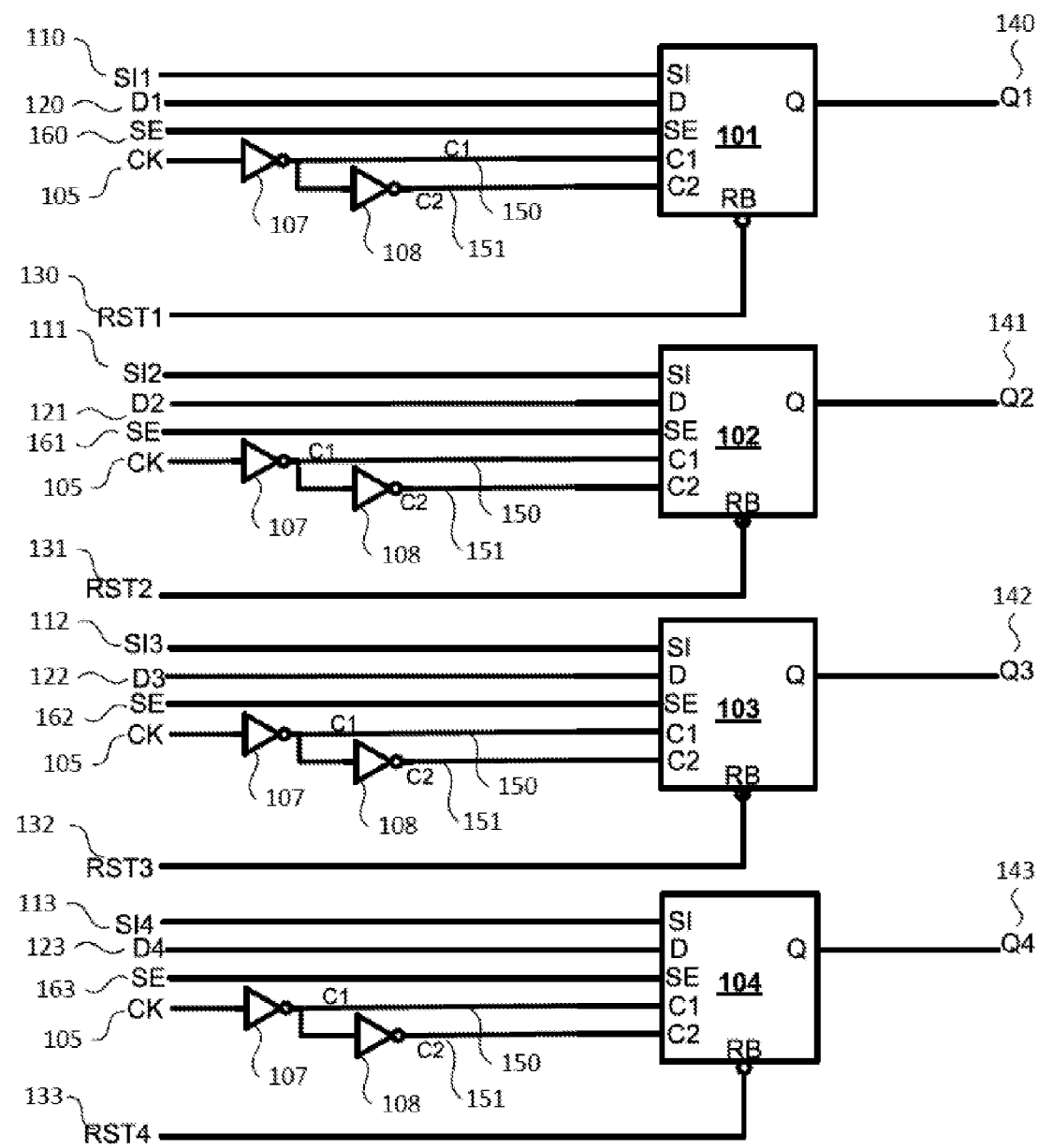
FIG. 1 is a schematic diagram of a memory device comprising four one-bit cells for storing four bits of information.

A group of cells logically organized as a register are often clocked identically. In this case, having separate clock circuits for each cell is inefficient. Accordingly, the present disclosure comprises a group of physically proximate cells wherein the clock circuitry is common to all of the cells. In this configuration, the physically proximate cells can be integrated into a single physical circuit known as a multi-bit register.

According to an embodiment of the present disclosure, there is provided a method of merging one-bit cells in an integrated circuit layout, the method comprising: identifying a set of one-bit cells in the integrated circuit layout; determining a set of merge cells, from among the identified set of one-bit cells, to be merged into a multi-bit register, the determination of the set of merge cells being based on each merge cell being located within a merge distance from each of the other merge cells in the set of merge cells, and each merge cell sharing a clock with the other merge cells in the set of merge cells; and generating instructions to a placer for merging the set of merge cells to form the multi-bit register in the integrated circuit layout.

In another embodiment, determining the set of merge cells is further based on each merge cell having the same track height as each of the other merge cells in the set of merge cells.

In another embodiment, determining the set of merge cells is further based on each merge cell having the same channel length as each of the other merge cells in the set of merge cells.

In another embodiment, determining the set of merge cells is further based on each merge cell having the same threshold voltage as each of the other merge cells in the set of merge cells.

In another embodiment, determining the set of merge cells is further based on each merge cell sharing a common enable with each of the other merge cells in the set of merge cells.

In another embodiment, determining the set of merge cells is further based on each merge cell having the same reset type as each of the other merge cells in the set of merge cells.

In another embodiment, determining the set of merge cells is further based on each merge cell sharing a common reset with each of the other merge cells in the set of merge cells.

In another embodiment, determining the set of merge cells is further based on each merge cell having the same scan-in type as each of the other merge cells in the set of merge cells.

In another embodiment, determining the set of merge cells is further based on each merge cell sharing a common scan-in enable with each of the other merge cells in the set of merge cells.

In another embodiment, determining the set of merge cells is further based on each merge cell being located within a square area of 100 μm by 100 μm of the other merge cells in the set of merge cells.

In another embodiment, the square area is a sliding window that is moved across the integrated circuit layout.

In another embodiment, the method further comprises: identifying a second set of one-bit cells in the integrated circuit layout; determining a second set of merge cells, from among the identified second set of one-bit cells, to be merged into a second multi-bit register, the determination of the second set of merge cells being based on each merge cell being located within a merge distance from each of the other merge cells in the second set of merge cells, and each merge cell sharing a clock with the other merge cells in the second set of merge cells; and generating instructions to the placer for merging the second set of merge cells to form the second multi-bit register in the integrated circuit layout.

In another embodiment, the method further comprises: determining functional timing constraints for the set of one-bit cells based on timing constraints data; and excluding the one-bit cells having functional timing constraints from the set of merge cells.

In another embodiment, the set of one-bit cells is identified based on instance name pattern.

In another embodiment, the method further comprises optimizing the placement of the multi-bit register in the integrated circuit layout.

In another embodiment, the method further comprises optimizing the placement of the set of one-bit cells in the integrated circuit layout before determining the set of merge cells.

According to an embodiment of the present disclosure, there is provided a system for merging one-bit cells in an integrated circuit layout, comprising: a database to store the integrated circuit layout; a placer in communication with the database to update the integrated circuit layout; and a merger in communication with the placer and configured to: identify a set of one-bit cells in the integrated circuit layout; determine a set of merge cells, from among the identified set of one-bit cells, to be merged into a multi-bit register, the determination of the set of merge cells being based on each merge cell being located within a merge distance from each of the other merge cells in the set of merge cells, and each merge cell sharing a clock with the other merge cells in the set of merge cells; and generate instructions to a placer for merging the set of merge cells to form the multi-bit register in the integrated circuit layout.

In another embodiment, the merger comprises a sliding window having a square area of 100 µm by 100 µm to define the merge distance.

In another embodiment, the merger is further configured to: determine functional timing constraints for the set of one-bit cells based on timing constraints data; and exclude the one-bit cells having functional timing constraints from the set of merge cells.

According to an embodiment of the present disclosure, there is provided a method of using a system for merging one-bit cells in an integrated circuit layout, the method comprising: building the integrated circuit layout in a database based on inputs comprising: a logical netlist, constraints, and a floorplan; operating a placer to place the one-bit cells and route connections between the one-bit cells in the integrated circuit layout; identifying, with a merger, a set of one-bit cells in the integrated circuit layout; determining, with the merger, a set of merge cells, from among the identified set of one-bit cells, to be merged into a multi-bit register, the determination of the set of merge cells being based on each merge cell being located within a merge distance from each of the other merge cells in the set of merge cells, and each merge cell sharing a clock with the other merge cells in the set of merge cells; generating, by the merger, instructions to a placer for merging the set of merge cells to form the multi-bit register in the integrated circuit layout; and further operating the placer to re-route the connections between the set of merge cells in order to the update the integrated circuit layout.

According to an embodiment of the present disclosure, there is provided a multi-bit register comprising: a plurality of one-bit cells; and a shared clock circuit providing timing to each of the plurality of one-bit cells, the plurality of one-bit cells being located, in a circuit layout for the multi-bit register, within a merge distance of each other, the merge distance selected to minimize the probability that the timing of a one-bit cell on a critical timing path will be detrimentally affected when the one-bit cell on the critical timing path is merged into the multi-bit register.

Other aspects and features of the present disclosure will become apparent to those ordinarily skilled in the art upon review of the following description of specific embodiments in conjunction with the accompanying figures.

FIG. 1 is a schematic diagram of four physically proximate one-bit cells 101-104. A one-bit cell is any memory element that can hold a one-bit state. For example, edge-triggered flip-fops and pulsed-latches are known one-bit cells.

Each one-bit cell 101-104 comprises respective scan-in, data, scan-in enable, inverted clock and non-inverted clock, and reset inputs, and a data output. Scan-in (SI) inputs 110, 111, 112, and 113 are enabled via respective scan-in enable signals (SE) 160-163. A scannable one-bit cell is advantageous for design for testability purposes but is not necessary for storing the one-bit state in the memory element.

Data inputs 120-123 receive the one-bit information for storage in each one-bit cell. Reset inputs 130-133 receive a reset input and operate to set the one-bit state of each cell to the "low" or "0" state. Data outputs 140-143 provide the one-bit state stored in each one-bit cell to devices connected to each data output.

A clock signal (CK) 105 is provided to each one-bit cell 101-104. The clock signal 105 is the same for each one-bit cell and synchronizes the operation of the cells 101-104. Inverters 107 and 108 generate inverted (C1) and non-inverted (C2) clock signals, 150 and 151, respectively. Inverted (C1) and non-inverted (C2) clock signals 150 and 151 are connected to the inverted and non-inverted clock enable inputs respectively of each one-bit cell 101-104.

Figure 2:
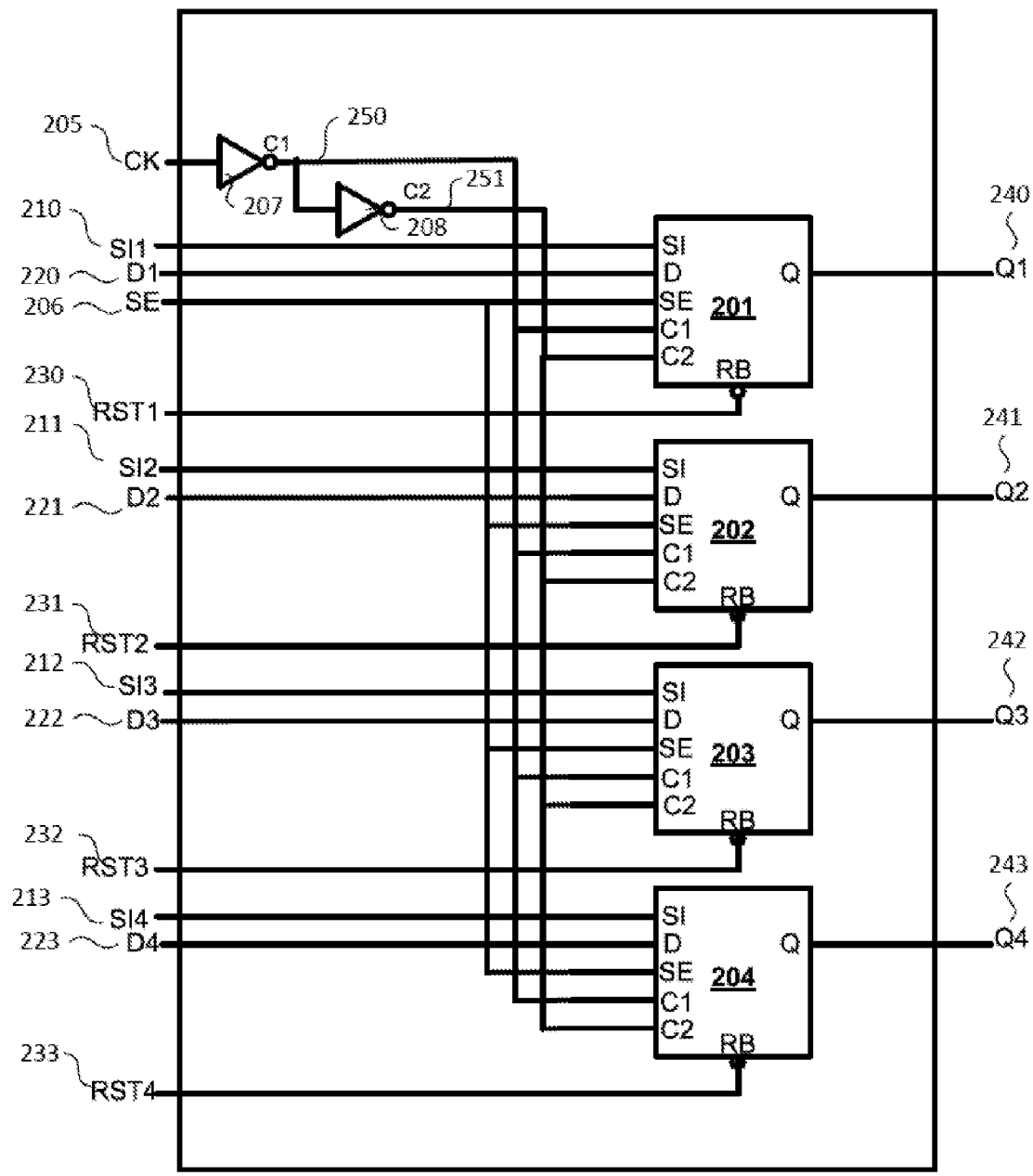
FIG. 2 is a schematic diagram of a four-bit multi-bit register memory device according to an embodiment of the present disclosure.

FIG. 2 is a schematic diagram of a four-bit multi-bit register (MBR) 200 according to an embodiment of the present disclosure. MBR 200 is constructed from merging the circuits of the four physically proximate one-bit cells, such as the cells 101-104 of FIG. 1, and sharing the internal clock tree. The merged cells may be edge-triggered flip-flops or pulsed-latches, for example.

Thus, MBR 200 comprises cells 201, 202, 203, and 204, each separately comprising respective scan-in, data, scan-in enable, inverted clock and non-inverted clock, and reset inputs, and a data output. In contrast to the four one-bit cells 101-104, the inverted and non-inverted clock signals C1 and C2 for each cell 201-204 are generated internally off a single clock signal (CK) 205.

Parallel scan-in inputs 210, 211, 212, and 213 function identically to scan-in inputs 110-113. Parallel data inputs 220, 221, 222, and 223 function identically to data inputs 120-123. Parallel reset inputs 230, 231, 232, and 233 function identically to reset inputs 130-133. And finally, parallel data outputs 240, 241, 242, and 243 function identically to data outputs 140-143.

A common scan-in enable 206 is used to activate or deactivate all of the parallel scan-in inputs 210, 211, 212, and 213 at the same time. In another embodiment, MBR 200 comprises separate and parallel scan-in enables for operating each scan-in input 210-213.

In yet another embodiment, MBR 200 comprises a common reset input shared among the cells 201-204 for resetting all of the cells at once.

In yet another embodiment, MBR 200 comprises a single serial scan-in input. Each of the cells 201-204 are configured in a daisy chain arrangement such that the serial scan-in data received at the serial scan-in input is propagated to each cell 201-204 after successive clock edges are received with the scan enable asserted.

In FIG. 2, the clock input 205 provides a clock signal (CK) to inverters 207 and 208 for generating inverted (C1)

and non-inverted (C2) clock signals, 250 and 251, internally in the MBR 200. Inverted (C1) and non-inverted (C2) clock signals 250 and 251 are connected to the inverted and non-inverted clock enable inputs respectively of each cell 201, 202, 203, and 204.

In FIG. 2, the clock circuit for the MBR 200 is shared by each of the cells 201, 202, 203, and 204. By sharing the clock circuit among the cells 201-204 and generating C1 and C2 internally in the MBR 200, the MBR 200 is able to achieve a number of performance advantages over the collection of four one-bit cells 101-104 of FIG. 1. For example, the advantages include: (1) area savings by sharing the internal clock circuits; (2) power savings due to the sharing of the internal clock circuits; and (3) power savings due to the reduction in loading on the clock trees used to distribute clock signals across the device.

Figure 3:
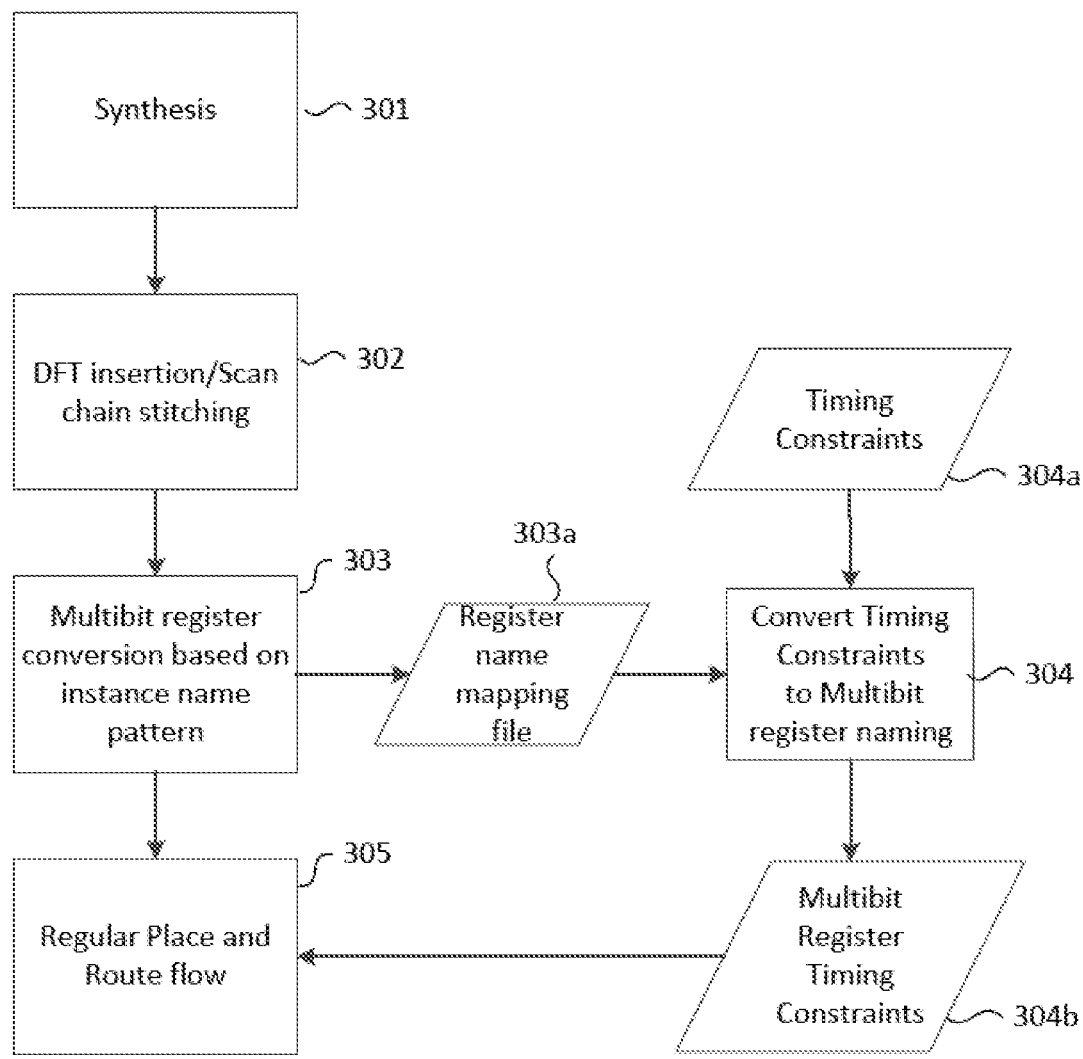
FIG. 3 is a block diagram of a physically-aware multi-bit register merge system according to an embodiment of the present disclosure.

FIG. 3 is a flow chart of a multi-bit register merge process according to an embodiment of the present disclosure. The method 300 of FIG. 3 shows steps for merging cells in an integrated circuit layout. While multi-bit registers can be introduced and optimized at several design phases in the integrated design flow, the preferred phase to merge one-bit cells into multi-bit registers in the integrated circuit design is during the layout phase.

The first phase of an integrated circuit design in which cells can be merged into multi-bit registers is at synthesis. Synthesis is the design phase at which a register-transfer level (RTL) specification of the integrated circuit design is synthesized and mapped to a gate-level netlist. At this phase of the design, the synthesis tool can use knowledge of the floorplan and other physical parameters to merge cells. Conventional synthesis tools provided by electronic design automation (EDA) vendors are known to merge cells into multi-bit registers at this phase of the design. However, merging cells at this design phase is not optimal because it is too early in the design to generate an accurate timing view of the physical implementation of the integrated circuit. Moreover, only ideal clock trees (virtual distribution of clocks which will be replaced later by actual circuits) are used during the synthesis phase; hence, path timing and clock skew are estimated and timing uncertainties are used to account for errors and to margin the timing of the gate-level netlist.

The second design phase in which cells can be merged is the post-synthesis and pre-layout phase. At this design phase, the gate-level netlist is further modified for testability or other reasons. Cells may be connected via their scan inputs/outputs into scan chains, power gating circuits such as isolation cells may be added at inputs or outputs of power-gated blocks, synchronizers may be added to allow communication between two asynchronous regions, etc. However, similarly to the synthesis phase, the post-synthesis and pre-layout phase also suffers from being too early in the design process to generate an accurate timing view of the physical implementation of the integrated circuit. This design phase also suffers from using ideal clock trees to estimate path timing and clock skew.

The third design phase in which cells can be merged is the layout phase. In an embodiment of the present disclosure, a method of merging cells into multi-bit registers comprises merging the cells in an integrated circuit layout. At the layout phase, after an initial placement, the physical positions of gates in the logical netlist are determined. Next, the clock trees are inserted and incremental placement optimization steps follow as determined by the timing, area and power constraints of the design. Wires are then routed between gates as specified by the connectivity in the logical netlist.

The layout phase is the preferred phase to merge cells into multi-bit registers. Introducing multi-bit registers into the integrated circuit design at this phase reduces the disadvantages associated with merging at the synthesis phase and at the post-synthesis and pre-layout phase. Specifically, at the layout design phase, the designer has an accurate timing view of the physical implementation of the integrated circuit; therefore, the designer does not need to estimate path timing and clock skew. Consequently, the merge process at the layout phase can generate multi-bit registers that are compatible with all required circuit constraints—power, area and timing. Merging at this step of the integrated circuit design also reduces uncertainty by avoiding any iterative process of merging registers and then needing to unmerge them for timing or other reasons. Finally, integration of each one-bit cell as a bit of a multi-bit register can be accomplished using flexible compatibility criteria.

Finally, the fourth design phase in which cells can be merged is the post-layout phase. At this design phase, the circuit timing is completely specified. Modifications to the circuit are made as engineering change orders (ECOs) and should have minimal impact on the integrated circuit design. Consequently, it is not optimal to merge cells at this design phase because the merge process would have a large impact on the integrated circuit design.

Thus, an embodiment according to the present disclosure is a method 300 comprising merging cells in an integrated circuit layout, as shown at FIG. 3, and is the last step before layout. While merging criteria of method 300 does not including timing, the method is useful for illustration purposes. At 301, a gate-level netlist is synthesized from an RTL specification of the integrated circuit. At 302, DFT insertion/Scan chain stitching connects all controllable cells into one or more scan chains via scan-in and data output ports.

At 303, the method converts cells to multi-bit registers based on a cell instance naming pattern. The cell instance naming pattern identifies all logically related cells with a common name because each instantiated cell shares a portion of its name with a logically related cell. The identified cells are merged into a multi-bit register, generating a register name mapping file 303a.

For example, according to an exemplary instance naming pattern, ABC_reg_0, ABC_reg_1, ABC_reg_2 can be merged into ABC_reg_x0_1_2x. According to another exemplary instance naming pattern, ABC_2_q_reg, ABC_3_q_reg, ABC_4_q_reg, are merged into ABC_x2_3_4x_q_reg.

A multi-bit register, however, adds an extra logical hierarchy as compared to the one-bit cells before the merge process. Therefore, at 304, the method uses the register name mapping file 303a to convert the one-bit cell timing constraints 304a of the integrated circuit layout into a multi-bit register timing constraints 304b.

At 305, the method uses the multi-bit register timing constraints 304b to place the cells of the multi-bit register in the integrated circuit layout, and to route the cells together to form the multi-bit register in the layout.

In a further embodiment, the method will optionally also ensure that additional merge criteria are followed. While the method will merge all cells sharing the same common name according to the cell instance naming pattern, exceptions will be made to ensure compliance with these additional merge criteria. For example, the method can exclude cells of different process technologies from being merged—all bits of a multi-bit register should be constructed from an identical process technology.

In another embodiment, for example, the method can exclude merging cells having clock inputs connected to different clock nets—the clock input of a multi-bit register should only connect to one clock net common to all the single bit cells being merged.

In yet another embodiment, for example, the method can exclude merging cells of different track heights. In what is known as a "Standard Cell" integrated circuit layout, cells of the integrated circuit are arranged in the layout according to a standard track height. Every merged cell should have a height that is the same as the track height. Cells having different track heights are generally not placement compatible.

In yet another embodiment, for example, the method can exclude merging cells that have a different number of data inputs or a different number of scan inputs.

In yet another embodiment, for example, the method can exclude merging cells if the multi-bit register is to have a single reset or set input connected to all of the internal cells, and the cells to be merged do not have a reset or set input. In other words, the method ensures that if the MBR has a single reset or set input, then all of the cells merged into the MBR must each have an identical reset or set input.

However, this additional criterion is not necessary for an MBR with parallel (i.e. not a single) reset or set inputs. Since each bit internal to the MBR is controlled by an independent reset or set input, the method can merge cells having different reset or set inputs and cells omitting reset or set inputs together into an MBR.

Reset and set inputs to the MBR may be synchronous or asynchronous. If an MBR has set or reset inputs, any of them or all of them can be tied inactive to match a cell that lacks the set or reset input. However, this costs area and power and is therefore not recommended.

Other examples of optional merge criteria include ensuring that cells to be merged have identical output drive strengths, threshold voltages, channel lengths, or timing constraints. With respect to timing constraints, if any functional timing exceptions are associated with pins of cells to be merged, these exceptions must be converted to be associated with the equivalent MBR pin name.

Although the method 300 of FIG. 3 generates an MBR with cells having similar timing, the method 300 is, nevertheless, insensitive to timing and physical layout issues. Occasionally however, a large group of registers may contain two cells having logically related names according to the naming patterns, but the two cells are physically placed a large distance apart in the layout. Merging these two cells can cause timing problems because the two physically distant cells will need to both meet timing on very different delay paths.

These physically distant cells can be excluded from merging by identifying cells that are not merge candidates or identifying groups of cells that cannot be inter-merged. Exclusions can ensure physically distant cells with adjacent names are not merged. Manually identifying cells for exclusion is an inefficient and labor-intensive process. According to an embodiment of the present disclosure, a physically-aware method of merging cells in an integrated circuit layout can automatically identify merge candidates to be excluded due to physical distance.

Also, flip-flops used as synchronizers or other special purposes are typically fast-resolving circuits and should be excluded from the merge candidates.

Figure 4:
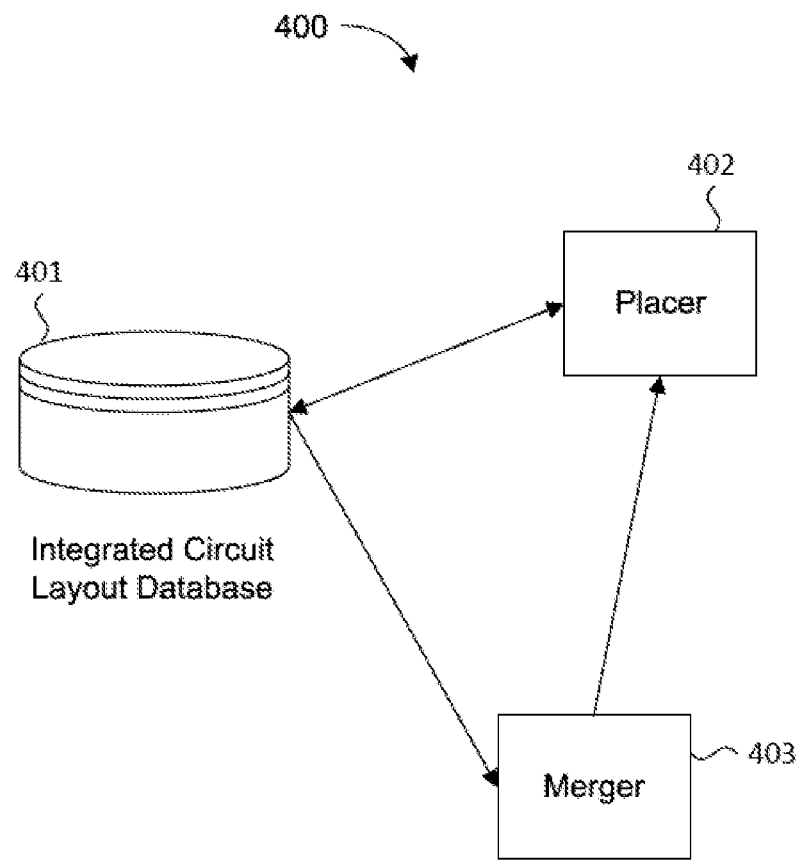
FIG. 4 is a flow chart of a multi-bit register merge process according to an embodiment of the present disclosure.

FIG. 4 is a block diagram of a physically-aware multi-bit register merge system according to an embodiment of the present disclosure. The system 400 comprises a database 401, a placer 402, and a merger 403. The computer-aided design (CAD) tool used to perform the integrated circuit layout operation is referred to as a place-and-route tool and consists of a placer to physically place cells and a router to interconnect the cells with metal wiring.

The integrated circuit layout is built and stored in database 401. The placer 402 is typically an EDA software tool in communication with the database 401. The placer 402 is used to build and update the layout in the database 401.

The placer 402 also receives and performs instructions generated by the merger 403, according to a method of merging cells into multi-bit registers as described in the present disclosure. In an embodiment, the placer 402 places cells according to an initial placement in the layout. The placer 402 may also adjust the placement of these cells during a placement optimization step prior to the merge operation.

In an embodiment of the present disclosure, the merger 403 is an EDA tool comprising a method executed on a computer processor in communication with both the database 401 and the placer 402. The merger 403 identifies a set of one-bit cells in the integrated circuit layout. The merger 403 then determines a set of merge cells, from among the identified set of one-bit cells, to be merged into a multi-bit register, the determination of the set of merge cells being based on each merge cell being located within a merge distance from each of the other merge cells in the set of merge cells, and each merge cell sharing a clock with the other merge cells in the set of merge cells. Finally, the merger 403 generates instructions to the placer 402 for merging the set of merge cells to form the multi-bit register in the integrated circuit layout and to reconnect it in the circuit.

After receiving the instructions generated by the merger 403, the placer 402 may further adjust the placement of the merged cells for optimization reasons. In an embodiment, the placer 402 performs placement optimization both before and after the multi-bit register merge itself, which can improve timing both before and then after the MBR merge. The placer 402 will also use the instructions generated by the merger 403 to re-route the clock circuits of each merged cell so that only a clock net is connected to the single clock input of the multi-bit register and all other clock nets associated with the merged single bit cells are removed.

Figure 5:
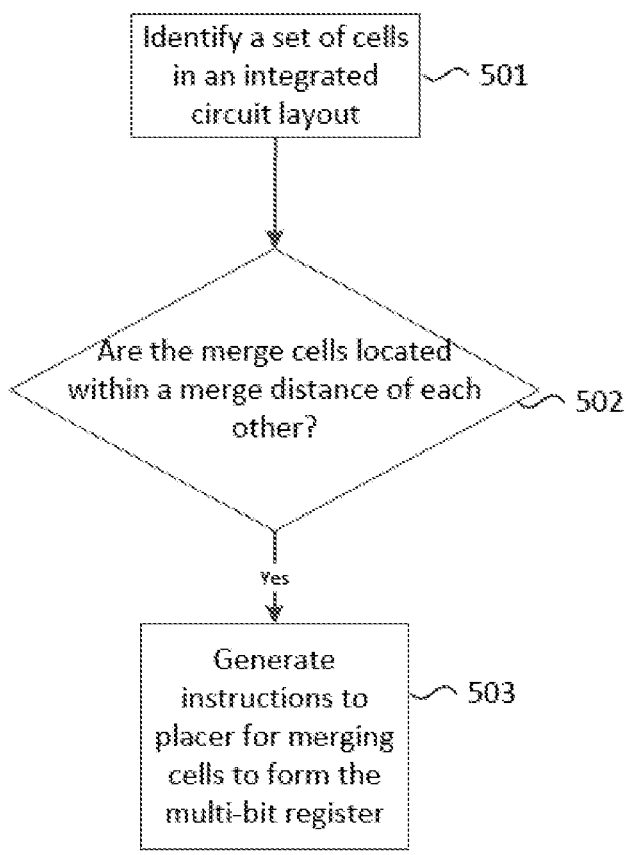
FIG. 5 is a flow chart of a physically-aware multi-bit register merge process according to an embodiment of the present disclosure.

FIG. 5 is a flow chart of a physically-aware multi-bit register merge process according to an embodiment of the present disclosure. A method 500 comprises identifying, at 501, a set of one-bit cells in the integrated circuit layout. In an embodiment, the one-bit cells have been placed in the integrated circuit layout by the placer 402 prior to the operation of method 500. The placer 402 may have optimized the initial placement of the cells in the layout prior to method 500.

At 502, the method determines a set of merge cells, from among the identified set of one-bit cells, to be merged into a multi-bit register, the determination of the set of merge cells being based on each merge cell being located within a merge distance from each of the other merge cells in the set of merge cells. In an embodiment, the determination is an arithmetic calculation. Since each of the cells has already been initially placed in the layout, each cell has a known location. By determining the relative distances between the candidate cells, the method 500 is said to be "physically-aware". This awareness of the physical limitations of the merge process helps to prevent timing issues caused by merging cells that are separated by a long distance in the layout.

The method further determines, at 502, that each merge cell shares a clock with the other merge cells in the set of merge cells. The cells of a multi-bit register are synchronous; therefore, cells that are merged into a multi-bit register should be connected to the same clock. Furthermore, the area, power and loading advantages of multi-bit registers relate to sharing clock circuits internally in the multi-bit register.

For each set of merge (compatible) cells that are within a merge distance of each other, at 503 the method generates instructions to a placer for merging the set of merge cells to form the multi-bit register in the integrated circuit layout. Typically, the integrated circuit layout is built and stored in a database. The placer is typically an EDA software tool in communication with the database. The placer is used to build and update the layout in the database.

After receiving the instructions generated by method 500, the placer may further adjust the placement of the merged cells for optimization reasons. In an embodiment, a method of the present disclosure comprises running placement optimization both before and after the multi-bit register merge itself, which can improve timing both before and then after the MBR merge. The placer will also use the instructions generated by method 500 to re-route the clock circuits of each merged cell so that only a clock net is connected to the single clock input of the multi-bit register and all other clock nets associated with the merged single bit cells are removed.

Although method 500 is shown for merging cells into one multi-bit register, the method is generally applicable for merging multiple multi-bit registers. The method 500 could be repeated iteratively to merge the many millions of single-bit cells in an integrated circuit into a much smaller number of multi-bit registers.

Timing issues may still motivate excluding specific cells from being merged into a multi-bit register. In an embodiment of the present disclosure the method 500 further comprises determining functional timing constraints for the set of one-bit cells based on timing constraints data, and excluding the one-bit cells having functional timing constraints from the set of merge cells.

In various other embodiments the method 500 comprises determining that the cells to be merged satisfy various other criteria, such as: track height, channel length, threshold voltage, common enable, reset type, common reset, scan-in type, and common scan-in enable.

Figure 6:
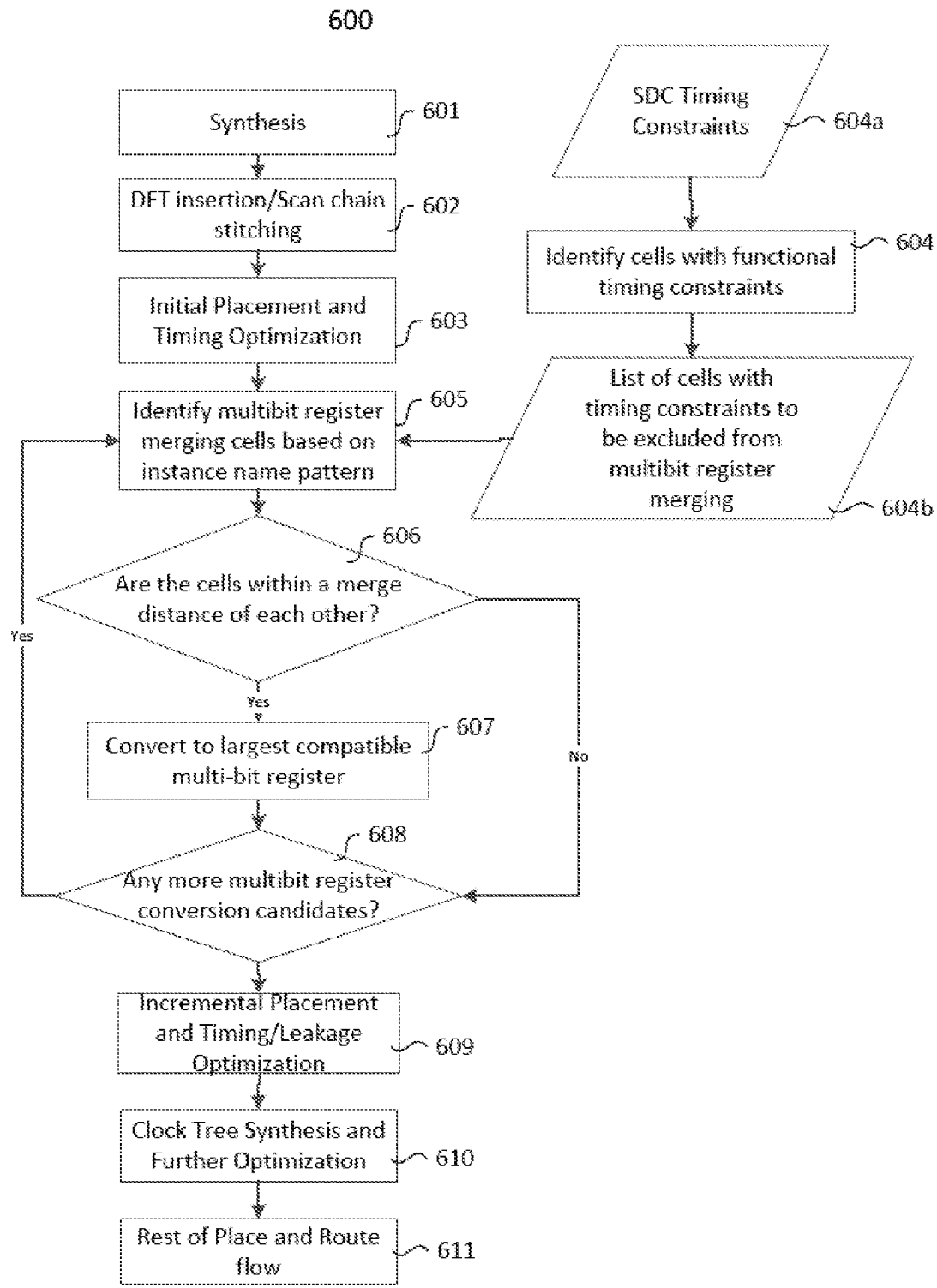
FIG. 6 is a flow chart of a physically-aware multi-bit register merge process according to an embodiment of the present disclosure.

FIG. 6 is a more detailed flow chart of a physically-aware multi-bit register merge process according to an embodiment of the present disclosure. At 601, a gate-level netlist is synthesized from an RTL specification of the integrated circuit. At 602, DFT insertion/Scan chain stitching connects all controllable one-bit cells into one or more scan chains via scan-in and data output ports. At 603, "Initial Placement and Timing Optimization" comprises initially placing the flip flops, memories, combinational cells and other components in the logical netlist into the layout.

At 604, the method 600 identifies cells with functional timing constraints based on a set of standard delay constraints (SDC) timing constraints 604a associated with the design and generally developed by the designer. The identified registers are used to generate a list 604b of cells to be excluded from multi-bit register merging.

At 605, the method 600 identifies cells in the integrated circuit layout as merge candidates based on instance name pattern and other compatibility criteria. The method also excludes cells from the exclusion list 604b as merge candidates. At 606, the method determines whether each of the candidate cells is located within a threshold merge distance of each other candidate cells in the layout. If all of the merge candidates are within a merge distance, at 607 the candidate cells are merged to form the largest possible multi-bit register (maximum bit count) and the multi-bit register is placed in the same general location as the candidate cells. If one of the merge candidates is not located within a merge distance of the other candidates in the layout, the method 600 continues to look for other merge candidates.

At 608, the method 600 determines whether there are any more candidate cells for converting into multi-bit registers. If there are more candidates, method 600 returns to 605 to identify cells in the integrated circuit layout as merge candidates.

If there are no more merge candidates, the method 600 proceeds to 609 for Incremental Placement and Timing Optimization to ensure that all placed cells, including the multi-bit registers, are assigned to legal and as-optimized-as-possible placement locations. Finally at 610, Clock Tree Synthesis and Further Optimization is performed to add the clock tree distribution circuits and to further optimize timing with the clock tree cells placed.

Finally at 611, the routing phase occurs, where physical connections are made in the layout according to the connectivity in the logical netlist.

According to the merge process of method 600, a very accurate physical view of cell placement is available. Consequently, the conversion of individual cells into multi-bit registers can be made with minimal detrimental impact to the integrated circuit layout. On the other hand, the conversion beneficially creates more compact clock trees because the clock tree loading is reduced substantially with each multi-bit register, which reduces the power required for driving the clock trees and registers.

According to another embodiment of the present disclosure, merge candidates are identified based on criteria other than the cell instance name pattern. In an example described in greater detail below, merge candidates are identified based on their presence in a sliding window that corresponds to an allowable merge distance. In further examples, the method considers other merge criteria.

Figure 7:
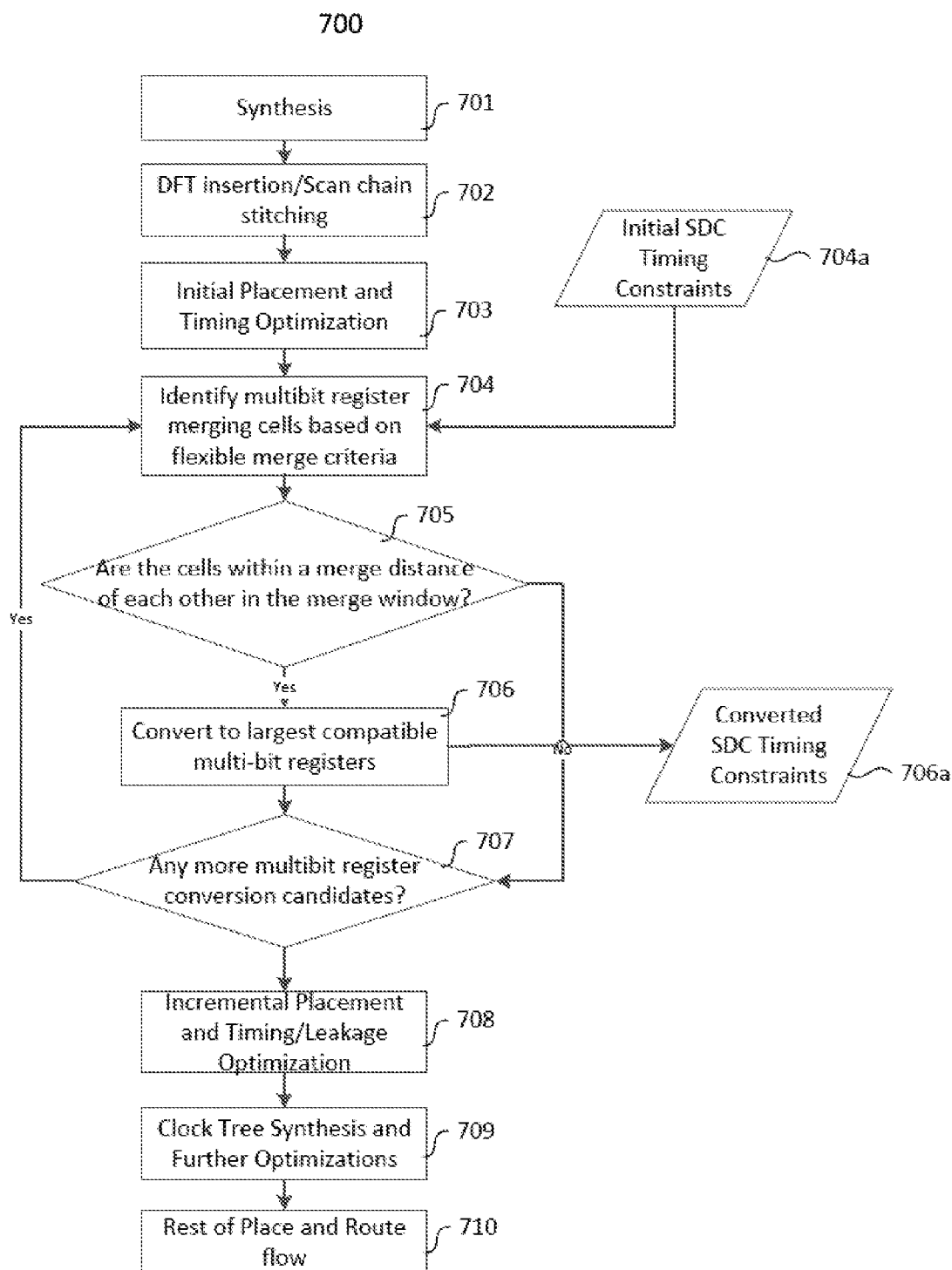
FIG. 7 is a flow chart of a physically-aware multi-bit register merge process according to an embodiment of the present disclosure.

FIG. 7 is a flow chart of a physically-aware multi-bit register merge process according to an embodiment of the present disclosure. At 701, a gate-level netlist is synthesized from an RTL specification of the integrated circuit. At 702, DFT insertion/Scan chain stitching connects all controllable cells into one or more scan chains via scan-in and data output ports. At 703, Initial Placement and Timing Optimization comprises initially placing the flip flops, memories, combinational cells and other components in the logical netlist into the layout.

At 704, the method 700 identifies cells in the integrated circuit layout as merge candidates based on more flexible merge criteria than method 600. The flexible merge criteria may be, for example, a wider variety of compatible cell types located in close proximity to each other. At 704, the method also uses a set of standard delay constraints (SDC) timing constraints 704a to identify the merge candidates.

At 705, the method determines whether each of the candidate cells is located within a threshold merge distance of each other candidate cell in the sliding merge window in the layout. If all of the merge candidates are within the merge distance, at 706 the candidate cells are converted to a multi-bit register and then proceeds to 707. The converted multi-bit register is associated with converted SDC timing constraints 706a, if the converted SDC timing constraints exist and if single bit cells with timing constraints have not already been excluded from merging.

If one of the merge candidates is not located within a merge distance of the other candidates in the layout, the method 700 proceeds to 707.

At 707, the method 700 determines whether there are any more candidate cells for converting into another multi-bit register. If there are more candidates, method 700 returns to 704 to identify cells in the integrated circuit layout as merge candidates.

If there are no more merge candidates, the method 700 proceeds to 708 for Incremental Placement and Timing Optimization to ensure that all placed cells including the multi-bit registers are assigned to legal and as-optimized-as-possible placement locations. At 709, Clock Tree Synthesis and Optimization is performed to add the clock tree distribution circuits and to further optimize against constraints with the clock tree cells placed.

Finally at 710, the routing phase occurs, where physical connections are made in the layout according to the connectivity in the logical netlist.

According to method 700, the merging process moves from region to region and merges cells that are considered compatible into multi-bit registers. The compatibility rules can be very general, which allows for optimum flexibility in candidate cell selection. Regions can also be overlapped using sliding and variable size windows to determine the current group of merge candidate cells and allow a candidate in one region that has failed to merge to be reconsidered in an adjacent region.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method of merging one-bit cells in an integrated circuit layout, the method comprising:
    identifying, using a computer processor, a set of merge candidate one-bit cells in the integrated circuit layout based on at least an instance naming pattern of the one-bit cells such that each of the one-bit cells in the merge candidate set has at least a part of its cell name in common with all other cells in the merge candidate set, the integrated circuit layout stored in a database;
    determining, using the processor, a set of merge cells, from among the cells in the merge candidate set, to be merged into a multi-bit register, the determination of the set of merge cells being based on each merge cell being located within a merge distance from each of the other merge cells in the set of merge cells, and each merge cell sharing a clock with the other merge cells in the set of merge cells; and
    generating, using the processor, instructions to a placer for merging the set of merge cells to form the multi-bit register in the integrated circuit layout.

2. The method of claim 1, wherein determining the set of merge cells is further based on each merge cell having the same track height as each of the other merge cells in the set of merge cells.

3. The method of claim 1, wherein determining the set of merge cells is further based on each merge cell having the same channel length as each of the other merge cells in the set of merge cells.

4. The method of claim 1, wherein determining the set of merge cells is further based on each merge cell having the same threshold voltage as each of the other merge cells in the set of merge cells.

5. The method of claim 1, wherein determining the set of merge cells is further based on each merge cell sharing a common enable with each of the other merge cells in the set of merge cells.

6. The method of claim 1, wherein determining the set of merge cells is further based on each merge cell having the same reset or set type as each of the other merge cells in the set of merge cells.

7. The method of claim 6, wherein determining the set of merge cells is further based on each merge cell sharing a common reset or set with each of the other merge cells in the set of merge cells.

8. The method of claim 1, wherein determining the set of merge cells is further based on each merge cell having the same scan-in type as each of the other merge cells in the set of merge cells.

9. The method of claim 8, wherein determining the set of merge cells is further based on each merge cell sharing a common scan-in enable with each of the other merge cells in the set of merge cells.

10. The method of claim 1, wherein determining the set of merge cells is further based on each merge cell being located within a merge area of 100 μm by 100 μm of the other merge cells in the set of merge cells.

11. The method of claim 10, wherein the merge area is defined by a sliding window that is moved incrementally across the integrated circuit layout in both horizontal and vertical directions.

12. The method of claim 1, wherein the set of merge candidate one-bit cells is a first set of merge candidate one-bit cells and wherein the set of merge cells is a first set of merge cells, the method further comprising:

identifying a second set of merge candidate one-bit cells in the integrated circuit layout;

determining a second set of merge cells, from among cells in the second merge candidate set, to be merged into a second multi-bit register, the determination of the second set of merge cells being based on each merge cell being located within a merge distance from each of the other merge cells in the second set of merge cells, and each merge cell sharing a clock with the other merge cells in the second set of merge cells; and generating instructions to the placer for merging the second set of merge cells to form the second multi-bit register in the integrated circuit layout.

13. The method of claim 1, further comprising:

determining functional timing constraints for the merge candidate set of one-bit cells based on timing constraints data; and excluding the one-bit cells having functional timing constraints from the set of merge cells.

14. The method of claim 1, further comprising optimizing the placement of the multi-bit register in the integrated circuit layout.

15. The method of claim 1, further comprising optimizing the placement of the merge candidate set of one-bit cells in the integrated circuit layout before determining the set of merge cells.

16. A system for merging one-bit cells in an integrated circuit layout, comprising:

a database to store the integrated circuit layout;

a placer in communication with the database to update the integrated circuit layout; and a merger in communication with the placer and configured to:

identify a set of merge candidate one-bit cells in the integrated circuit layout based on at least an instance naming pattern of the one-bit cells such that each of the one-bit cells in the merge candidate set has at least a part of its cell name in common with all other cells in the merge candidate set;

determine a set of merge cells, from among the cells in the merge candidate set, to be merged into a multi-bit register, the determination of the set of merge cells being based on each merge cell being located within a merge distance from each of the other merge cells in the set of merge cells, and each merge cell sharing a clock with the other merge cells in the set of merge cells; and generate instructions to a placer for merging the set of merge cells to form the multi-bit register in the integrated circuit layout.

17. The system of claim 16, wherein the merger comprises a sliding window having a merge area of 100 μm by 100 μm to define the merge distance, wherein the sliding window is moved incrementally across the integrated circuit layout in both horizontal and vertical directions.

18. The system of claim 16, wherein the merger is further configured to:

determine functional timing constraints for the merge candidate set of one-bit cells based on timing constraints data; and exclude the one-bit cells having functional timing constraints from the set of merge cells.

19. A method of using a system for merging one-bit cells in an integrated circuit layout, the method comprising:

building the integrated circuit layout in a database based on inputs comprising: a logical netlist, constraints, and a floorplan;

operating a placer to place the one-bit cells and route connections between the one-bit cells in the integrated circuit layout;

identifying, using a computer processor, with a merger, a set of merge candidate one-bit cells in the integrated circuit layout based on at least an instance naming pattern of the one-bit cells such that each of the one-bit cells in the merge candidate set has at least a part of its cell name in common with all other cells in the merge candidate set;

determining, using the computer processor, with the merger, a set of merge cells, from among the cells in the merge candidate set, to be merged into a multi-bit register, the determination of the set of merge cells being based on each merge cell being located within a merge distance from each of the other merge cells in the set of merge cells, and each merge cell sharing a clock with the other merge cells in the set of merge cells;

generating, using the computer processor, by the merger, instructions to a placer for merging the set of merge cells to form the multi-bit register in the integrated circuit layout; and further operating the placer to re-route the connections between the set of merge cells in order to the update the integrated circuit layout.

\* \* \* \* \*